(12) United States Patent
Deitz et al.

(10) Patent No.: US 7,020,876 B1
(45) Date of Patent: Mar. 28, 2006

(54) CAMPAIGN MANAGEMENT FOR BATCH PROCESSES

(75) Inventors: David L. Deitz, Austin, TX (US); Diego M. Benavides, Austin, TX (US); Nathan W. Pettus, Georgetown, TX (US); Grant Wilson, Austin, TX (US); Robert M. Lenich, Austin, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 444 days.

(21) Appl. No.: 09/609,091

(22) Filed: Jun. 30, 2000

(51) Int. Cl.
*G06F 9/46* (2006.01)
*G05B 15/00* (2006.01)

(52) U.S. Cl. .......................... 718/100; 700/1
(58) Field of Classification Search ............ 700/1, 700/9–12; 709/100–102; 718/100, 102
See application file for complete search history.

(56) References Cited

U.S. PATENT DOCUMENTS

| | | | |
|---|---|---|---|
| 5,113,350 A * | 5/1992 | Sargent | 700/239 |
| 5,499,188 A | 3/1996 | Kline, Jr. et al. | |
| 5,576,946 A | 11/1996 | Bender et al. | |
| 6,000,830 A * | 12/1999 | Asano et al. | 700/121 |
| 6,292,708 B1 * | 9/2001 | Allen et al. | 700/121 |
| 6,385,496 B1 * | 5/2002 | Irwin et al. | 700/87 |
| 6,438,436 B1 * | 8/2002 | Hohkibara et al. | 700/97 |
| 6,488,037 B1 * | 12/2002 | Guldi | 134/1.3 |
| 6,606,527 B1 * | 8/2003 | de Andrade et al. | 700/97 |
| 6,684,117 B1 * | 1/2004 | Bacin et al. | 700/98 |

FOREIGN PATENT DOCUMENTS

GB 2 352 060 A 1/2001

OTHER PUBLICATIONS

"Fisher-Rosemount System Expands the DeltaV System to 30,000 Points with Release 5;" Emerson Process Management—News; Jun. 29, 2000.

(Continued)

*Primary Examiner*—Meng-Al T. An
*Assistant Examiner*—Syed J Ali
(74) *Attorney, Agent, or Firm*—Marshall, Gerstein & Borun LLP

(57) ABSTRACT

A campaign management technique for batch processes enables a process control system user to flexibly create, edit and execute batch process campaigns. The campaign management technique uses a campaign management function that sends messages requesting batch information to a batch executive function. The batch executive function extracts the requested batch information from a database and sends responsive messages containing the requested batch information to the campaign management function. The campaign management function displays the requested batch information to a user via a graphical display and enables the user to select batch information to be included within a batch process campaign. The user can create a campaign having multiple types of batches, which can include special startup and cleanup batches. The campaign management function releases batches of a campaign for execution by the batch executive function according to a user-specified batch execution mode, which may queue a ready batch in the batch executive function prior to the completion of a currently executing batch. A user can add batches to a campaign and/or can modify or delete unreleased batches of a currently executing campaign. Additionally, the campaign management function is tightly integrated with a data historian function and a security function and automatically sends campaign execution messages to the data historian and uses the security function to control user access to the campaign management function.

45 Claims, 10 Drawing Sheets

OTHER PUBLICATIONS

U.K. Patent Office Search Report dated Sep. 27, 2001.
Substantive Examination Report dated Jan. 15, 2004.
Examination Report under Section 18(3) issued in GB 0115975.5 application by the United Kingdom Patent Office on Oct. 6, 2004.

* cited by examiner

FIG. 7

CAMPAIGN MANAGEMENT FOR BATCH PROCESSES

FIELD OF THE INVENTION

The invention relates generally to process control systems and, more specifically, to a campaign management technique that performs supervisory control functions over the creation and execution of batch process campaigns by a process control system.

DESCRIPTION OF THE RELATED ART

Process control systems, such as those that use batch processing techniques to produce large quantities of pharmaceuticals, chemicals, beverages, paint, or any other product, generally include one or more centralized process controllers communicatively coupled to one or more field devices which may be, for example, valve positioners, switches, sensors (such as temperature, pressure and flow rate sensors), etc. These field devices may be associated with control equipment such as, for example, valves, pumps, mixing units, etc., may perform physical control functions (such as opening or closing a valve, turning a pump or mixing unit on and off, etc.) within a process control system, may take measurements within the process control system for use in controlling the operation of the process or may perform any other desired function within the process control system. Generally speaking, the process controllers receive signals indicative of measurements made by one or more field devices and/or other information pertaining to the field devices, use this information to implement a typically complex control routine and generate control signals that are sent via the signal lines or buses to the field devices to control the operation of the process control system.

Furthermore, the process controllers are generally coupled via a data highway, such as an Ethernet bus, to one or more workstations and other devices. These other devices typically run other applications or programs that use the information provided by the one or more controllers to provide other process control functions, such as providing a user interface to the control routine, enabling modification or updating of the control routine, interfacing with the field devices, storing historical process control data, controlling or restricting user access, etc. In some large process control systems, one or more workstations located at a remote site may be coupled to the data highway via a further communication network, such as an Internet connection, a satellite or cellular communication link, a radio link (as used in wireless Ethernet connections), etc.

Process control systems that produce batches of products typically include a graphical interface, which enables a user (e.g., an engineer) to define and store one or more basic product recipes, batch parameters, equipment lists, etc. These basic product recipes typically include a sequence of process steps that are each associated with or bound to a particular equipment list. In binding recipe process steps to particular pieces of equipment, the user (e.g., an operator) explicitly defines, prior to the batch execution of the recipe, which piece of process control equipment to be used to carry out each process step of the recipe. Additionally, each of the process steps may require a user (e.g., an operator) to define one or more input/output (I/O) batch parameter values that are used during the execution of a batch to control the sequence and/or timing of equipment operations, set alarm limits, set target control values (e.g., setpoints), etc. These I/O parameter values may be associated with inputs and outputs that are sent to or which are received from one or more of the field devices within the process control system or, alternatively, may be intermediate or calculated values that are generated by the process control system during the execution of a batch. Thus, in defining a batch, a user (e.g., an operator) typically uses the graphical interface to select a basic product recipe (which includes specifications that bind the process steps of the recipe to process control equipment) and to specify the parameter values that are to be used during execution of the batch. For example, in a control system that produces batches of paint, a user (e.g., an operator) may interact with the graphical interface to select a basic paint recipe such as, for example, a semi-gloss exterior latex paint, and may specify parameter values that result in the production of a batch of 100 gallons of a particular color of semi-gloss exterior latex paint.

By way of example only, a basic paint recipe may include one or more process steps that add colorants or other substances to a basic paint mixture and may further include additional process steps that mechanically blend these colorants and other substances into the basic paint mixture. The blending and mixing process steps, or any other process steps associated with the basic paint recipe, may be bound to specific pieces of equipment within the process control system. For example, a first mixing step may be bound to a first blender and a second mixing step may be bound to a second blender or, alternatively, if desired, the second mixing step may instead be bound to the first blender. Similarly, each process step of the recipe that adds colorant to the paint mixture may be bound to a particular piece of colorant dispensing equipment.

Furthermore, in defining a batch, a user may provide a variety of I/O parameter values such as blending times, colorant amounts, etc. that are used by the process control system during execution of the batch to carry out the process steps specified by the batch and to achieve a desired final paint product. Thus, with conventional batch definition techniques, a user can produce a variety of final paint products including a variety of basic paint types (as specified by basic recipes) in a variety of colors (as specified by I/O parameter values). Of course, because conventional batch definition techniques may also be used to create many other types of products such as pharmaceuticals, beverages, food products, etc., the particular process steps, equipment bound to the process steps and the I/O parameter values may be varied so that the process control system produces the desired final product.

Production campaigns are a well known technique for increasing the operating efficiency of batch-oriented process control systems. Traditionally, a production campaign specifies the repetitive execution of identical batches. In some conventional batch-oriented process control systems, a user can create a production campaign by manually defining a batch multiple times. For example, if the user desires to create a campaign including twenty batches of a particular paint recipe, the user interacts with a batch definition interface to specify the same recipe and parameter values twenty times. Of course, such repetitive definition of a batch to create a campaign requires the user to enter a substantial amount of data and, as a result, some batch definition interfaces have been developed that enable the user to create a campaign by defining a batch once and then specifying the number of times the batch is to be executed to complete the campaign.

In any event, conventional techniques for creating a production campaign are relatively inflexible because they typically do not allow a user to create a campaign containing different types of batches. In other words, with conventional techniques for creating a production campaign, the user can typically only create campaigns that contain identical batches. Furthermore, conventional techniques for creating and executing a production campaign are typically not tightly integrated with the batch definition and execution functions of the process control system, nor are these conventional campaign creation and execution techniques tightly integrated with other process control functions such as security functions (i.e., user access control), data historian functions, etc. In fact, the security functions, data historian functions, and other functions within the process control system typically do not have any access to the batch-related information that is stored within the database used by the batch definition and execution functions. As a result, the user must manually enter a substantial amount of data to create separate batch information databases within each process control system function that the user wants to integrate with the processes of creating and executing campaigns. Unfortunately, the manual creation and maintenance of separate batch information databases requires the user to remember to synchronize the databases (i.e., make the information consistent between the databases) if, for example, changes are made to a recipe, a batch parameter or any other batch-related information within any one of the databases.

Additionally, conventional campaign creation and execution techniques often result in inefficient usage of batch execution memory and processing resources. For example, with one conventional campaign creation technique, the user interacts with the batch definition function to create and instantiate a plurality of batches one batch at a time. As a practical matter, when using this conventional campaign creation technique, users will typically create and instantiate all desired batches of a campaign regardless of whether any batches have completed execution and regardless of whether there is any equipment available to execute more than one of these instantiated batches. As a result, a number of instantiated batches that are waiting to be executed may be needlessly consuming memory and processing resources of the batch execution function.

With another conventional campaign creation technique, the user interacts with the batch definition function to create and instantiate a single batch and then interacts with simple campaign creation and execution functions enable the user to specify the number of times that the defined batch is to be executed (i.e., repeated) by the campaign execution function.

Furthermore, conventional campaign creation and execution techniques do not typically allow the user to make any substantive changes to a campaign once the campaign has been created and instantiated within or released to the batch execution function. For example, although some conventional process control systems enable a user to make limited changes to the parameter values used during execution of a campaign, these conventional systems typically do not allow a user to change which recipe is produced by a given batch of a running campaign nor do these conventional systems allow the user to bind a different piece of equipment to any process step once the campaign has been created and instantiated within the batch execution function.

SUMMARY OF THE INVENTION

A campaign management technique is tightly integrated with a process control system and performs supervisory control functions over the creation and execution of batch process campaigns by the process control system. Generally speaking, the campaign management technique described herein provides a high level supervisory function that overlays and is tightly integrated with batch definition and execution functions. The campaign management technique may also be tightly integrated with other batch-related functions such as a batch historian function and/or a security (i.e., user access control) function, or any other process control system function.

According to one aspect of the invention, a system and method of creating a batch process campaign sends a first message requesting batch information to a batch creation function and receives a second message containing a set of batch information in response to the first message requesting batch information. The system and method displays the set of batch information using a graphical user interface and prompts a user to enter a first input identifying a subset of the set of batch information from the displayed set of batch information to be included within at least one batch of the plurality of batches. Additionally, the system and method prompts the user to enter a second input specifying campaign information to be included within the batch process campaign and uses the first and second inputs to create the batch process campaign.

According to another aspect of the invention, a system and method of executing a batch process campaign determines a batch execution mode associated with the batch process campaign and releases one or more batches from a plurality of batches to a batch execution function based on the batch execution mode. The system and method also sends messages to the batch execution function to cause the batch execution function to execute one or more of the released batches.

According to yet another aspect of the invention, a system and method of editing a batch process campaign prompts a user to enter a first input via a graphical user interface identifying one or more unreleased batches from the batch process campaign. Further, the system and method prompts the user to enter a second input via the graphical user interface specifying a change to batch information associated with the identified one or more unreleased batches and stores the change to the batch information together with the batch process campaign in a data store.

BRIEF DESCRIPTION OF THE DRAWINGS

FIG. 7 is an exemplary illustration of a batch campaign properties window that enables a user to select and optimize the manner in which batches within a campaign are released to and started by the batch executive of FIG. 2;

DESCRIPTION OF THE PREFERRED EMBODIMENTS

While a campaign management technique is described herein in conjunction with a process control system that produces paint, it should be noted that the campaign management technique described herein can be advantageously used within a variety of batch-oriented process control systems, including, for example, process control systems that produce pharmaceuticals, chemicals, food products, consumer goods, or any other product. Before discussing the campaign management technique in greater detail, it is important to recognize that conventional campaign creation and execution techniques typically do not have access to the information contained within the database used by the batch definition and execution functions. Instead, these conventional techniques require the user to recreate the batch information database within each process control system function with which the user wants the campaign creation and execution functions to communicate. Furthermore, these conventional campaign creation and execution techniques require the user to remember to manually update all of the batch information databases when changes are made within any one of the batch information databases. In other words, the user must typically engage in a significant effort to recreate a large batch information database multiple times and must manually maintain synchronization of these multiple batch information databases so that campaigns created by a campaign creation function, which may use one batch information database, will operate properly when executed by the batch execution function, which may use another batch information database that is different from the database used by the campaign creation function.

Additionally, with conventional campaign creation and execution techniques, typically a user cannot edit any portion of a campaign once execution of the campaign has begun. As a result, if any equipment used during execution of the campaign fails, the user can only remedy the situation by halting the execution of the entire campaign and creating a new campaign that uses alternative functional equipment. Similarly, if a user wishes to change a recipe associated with a particular batch within a campaign (in response to a change in a customer's order, for example), the user must again halt the execution of the entire campaign and create a new campaign that specifies the desired types of batches.

Figure 1:
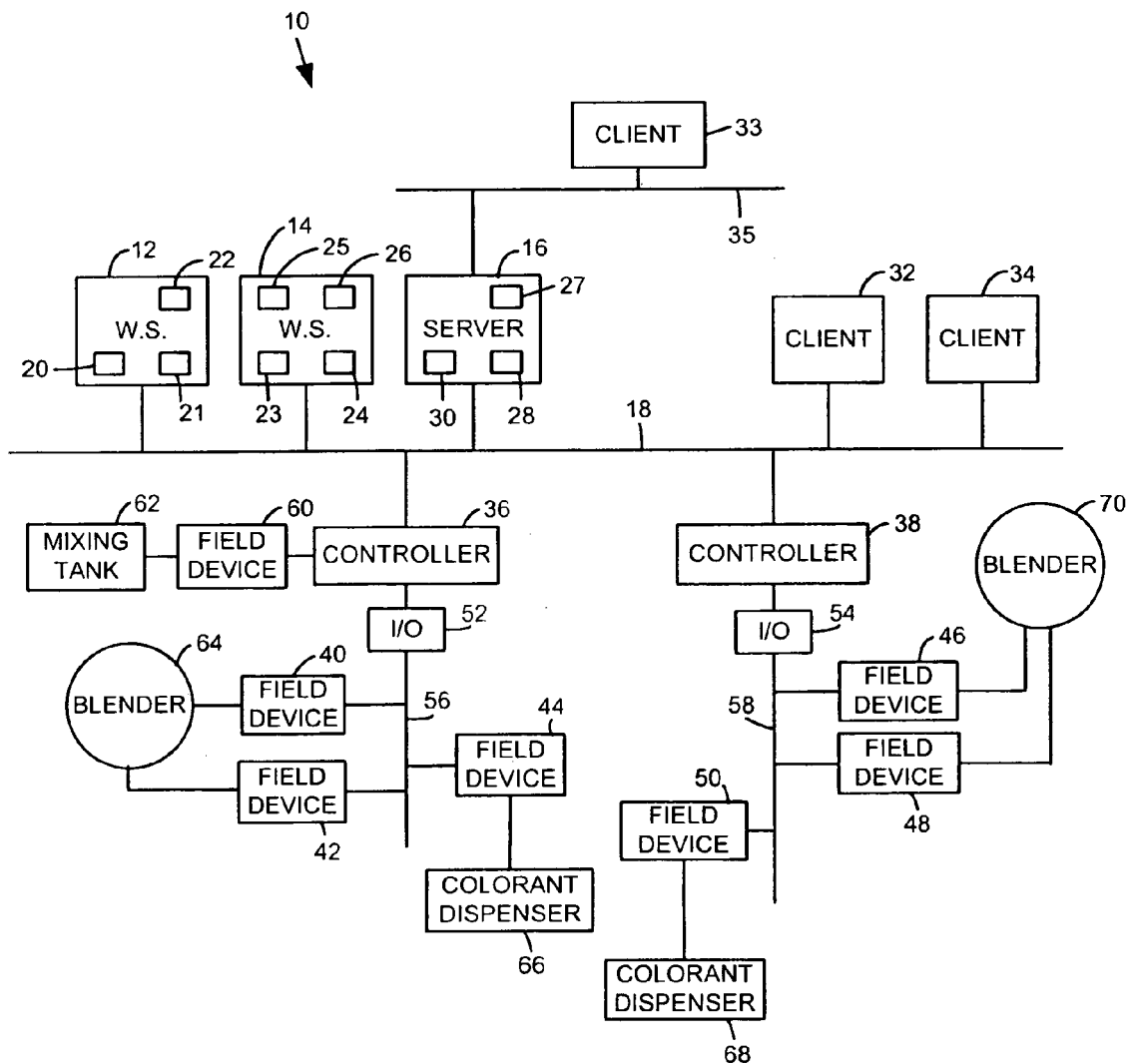
FIG. 1 is a schematic block diagram of a process control system that uses a campaign management technique to perform supervisory control functions over the creation and execution of batch process campaigns.

FIG. 1 is a schematic block diagram of a process control system 10 that uses a campaign management technique to perform supervisory control functions over the creation and execution of batch process campaigns. In particular, by way of example only, the process control system 10 is configured to produce batches of paint. However, it should be understood that the campaign management technique described herein may be advantageously used within any process control system that produces batches of pharmaceuticals, chemicals, food products, or any other product. The process control system 10 includes workstations 12 and 14 and a server 16 that are communicatively coupled via a system level databus 18, which may be an Ethernet databus or any other databus suitable for the transmission of data. The workstations 12 and 14 may perform a variety of known process control functions. For example, the workstation 12 may include a routine 20 stored on a memory 21 and executed by a processor 22 that performs security functions, which control user access to other functions and information within the process control system 10. Similarly, the workstation 14 may include routines 23 and 24 that are stored on a memory 25 and which are executed by a processor 26 to provide data historian and batch executive functions, respectively. The server 16 may be a workstation having a processor 27 that executes one or more software routines 28 stored on a memory 30 to perform the campaign management techniques described herein. The server 16 may communicate with clients 32 and 34 over the system level databus 18, or alternatively, over any other suitable communication link such as a satellite-based wireless link, modem link, etc. Similarly, the server 16 may also communicate with a client 33 on another node or system via a databus 35, which may also be an Ethernet databus or any other suitable databus. The clients 32–34, may be running on any type of hardware platform such as a workstation, personal data assistant, laptop computer, etc. that can communicate with the server 16. Of course, other devices such as data storage devices, additional user interfaces, etc. (not shown) may also be connected to the system level databus 18 and/or the databus 35 associated with the other node or system.

The process control system 10 further includes first and second controllers 36 and 38, which may be distributed control system (DCS) type controllers, or any other type of controller, and which may be communicatively coupled to the system level databus 18 using either a proprietary communication protocol, or any other suitable communication protocol. The controllers 36 and 38 communicate with respective field devices 40–44 and 46–50 via respective first and second input/output (I/O) devices 52 and 54 and controller databusses 56 and 58. As shown in FIG. 1, the field devices 40–50 are smart field devices that communicate information related to the process control system 10 by sending messages over the controller databusses 56 and 58. As is well known, smart field devices may be used to execute one or more process control loops either in conjunction with, or independently from a controller. The smart field devices 40–50 may be, for example, Fieldbus devices, in which case the controller databusses 56 and 58 are non-proprietary protocol databusses that use the Fieldbus signal protocol. However, other types of devices and protocols such as the HART®, PROFIBUS®, WORLDFIP®, Device-Net®, CAN, and AS-Interface protocols could be used as well. Additionally, the controllers 36 and 38 may be directly connected to conventional (i.e., non-smart) field devices (e.g., field devices having a conventional analog interface such as 4–20 mA or 0–10 VDC). For example, as shown in FIG. 1, the first controller 36 is connected to a conventional non-smart field device 60.

The field devices 40–50 and 60 are connected to equipment 62–70. In particular, the non-smart field device 60 is connected to the mixing tank 62, the field devices 40 and 42 are connected to the first blender 64, the field device 44 is connected to the first colorant dispenser 66, the field devices 46 and 48 are connected to a second blender 70 and the field device 50 is connected to the second colorant dispenser 68.

Although not shown in FIG. 1, the process control system 10 may include additional controllers, field devices and equipment as needed to produce batches of paint.

Figure 2:
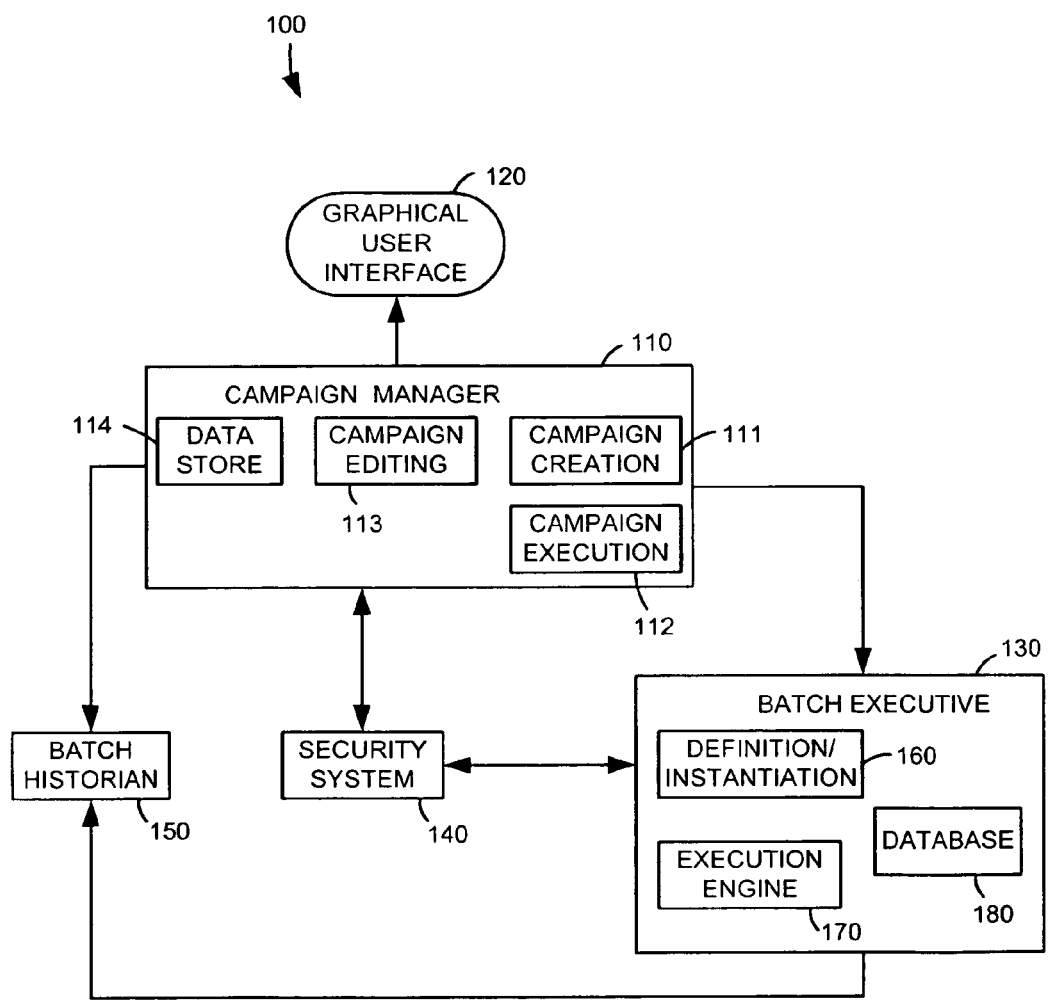
FIG. 2 is an exemplary schematic block diagram that illustrates how the campaign management techniques executed by the server of FIG. 1 are tightly integrated with other process control functions.

FIG. 2 is an exemplary schematic block diagram 100 that illustrates how the campaign management techniques executed by the server 16 of FIG. 1 are tightly integrated with other process control functions of the process control system 10 shown in FIG. 1. The campaign management techniques described herein are performed by a campaign manager 110 having a campaign creation function 111, a campaign execution function 112, a campaign editing function 113 and a data store 114. Generally speaking, the campaign creation function 111 supervises the creation of batch process campaigns, the campaign execution function 112 controls the release of batches for execution, and the campaign editing function 113 enables a user to edit unreleased batches on-the-fly, which enables the user to respond flexibly to equipment failures, last minute customer order changes, etc. The campaign manager 110 exchanges messages and other information with other functions within the process control system 10. In particular, the campaign manager 110 receives inputs and commands from a user via a graphical user interface 120 and communicates with a batch executive 130, a security system 140 and a batch historian 150. Additionally, as shown in FIG. 2, the batch executive 130 sends batch execution messages to the data historian 150 and communicates with the security system 140.

The batch executive 130, the security system 140 and the batch historian 150 are well known process control functions. In particular, the batch executive 130 has a definition/instantiation function 160, an execution engine 170 and a database 180. The batch executive 130 may reside on the server 14, or may reside on any other node or system within the process control system 10 such as, for example, the workstation 12 or the server 16. The batch executive 130 may be any system that defines (i.e., creates) and executes batches, such as the DeltaV™ Batch Executive provided by Fisher-Rosemount Systems, Inc., for example, that enables a user to define recipes, equipment lists, batch parameters, etc. for batch execution and carries out the execution of a batch process. In creating a recipe, the definition/instantiation function 160 may provide the user with a graphical interface, for example, that enables the user to specify the process steps of a recipe, the equipment to which each process step is bound, etc. The user may enter these specifications via keyboard entries or, alternatively or additionally, using point and click mouse operations in conjunction with icons, pull-down menus, or any other conventional graphical user interface techniques. Additionally, the definition/instantiation function 160 may allow the user to further specify a batch by specifying specific parameter values to be used in executing a given recipe within the batch.

The database 180 stores batch definition and execution information such as detailed recipe information, equipment availability and profiles, binding information, batch execution status information, etc. Batch-related information (i.e., recipes, batch parameter values, etc.) that is created using the definition/instantiation function 160 is stored within the database 180 for use by the execution engine 170 during execution of a batch and, as discussed in more detail below, by the campaign manager 110 and graphical user interface 120 during the creation and execution of a campaign.

The campaign manager 110 does not maintain or require the user to maintain a separate batch information database within the campaign management function. To the contrary, the campaign manager 110, which resides within the server 16, for example, can send messages (i.e., requests) over the system level databus 18 to the batch executive 130 (which may, for example, reside within the workstation 14) to extract batch-related information as needed from the database 180 (which may be stored on the memory 25) to create and execute campaigns. Thus, the campaign manager 110 and the batch executive 130 share a single repository of batch information, which eliminates the need for the user to create and maintain (i.e., synchronize) multiple copies of the database 180, as is typical with conventional campaign creation and execution techniques.

The batch execution engine 170 receives and instantiates batches that have been released for execution by the campaign execution function 112. During the execution of a campaign, the batch execution engine 170 handles equipment arbitration and sends messages including batch execution status information, equipment availability, etc. to the campaign execution function 112 and the batch historian 150. In particular, the batch execution engine 170 sends messages to and receives messages from one or both of the controllers 36 and 38 to initiate appropriate procedures in one or more the smart field devices 40–50 and to exchange appropriate messages/signals with one or more of the field devices 40–50 and 60 to carry out the process steps associated with the batch currently being executed by the batch execution engine 170.

The campaign creation function 111, the campaign execution function 112, and the campaign editing function 113 work in conjunction with the graphical user interface 120 to enable a user to create and execute batch process campaigns. In particular, the campaign creation function 111 enables the user to flexibly create a campaign that contains multiple types of batches and further enables the user to select one from a plurality of operating modes that control the release of batches to the batch executive 130 to more efficiently utilize the memory and processing resources associated with the batch executive 130.

The graphical user interface 120 may be implemented using, for example, a Windows™ operating environment and, thus, may include a variety of pull-down menus, icons and other graphics to facilitate the creation of batch process campaigns, the monitoring of campaign status, the editing of campaigns, etc. It should be recognized that the graphical user interface 120 may running as a client application within one of the clients 32–34 or, alternatively, could be running on any other client on any other node or system within the process control system 10. Further, it should be recognized that the graphical user interface 120 may be based on virtually any hardware platform including, for example, personal data assistants, barcode scanners, laptops, palmtops, etc. and may communicate with the campaign manager 110 over the system level databus 18, or any other hardwired or wireless communication link (e.g., cellular link, satellite link, etc.)

Figure 3:
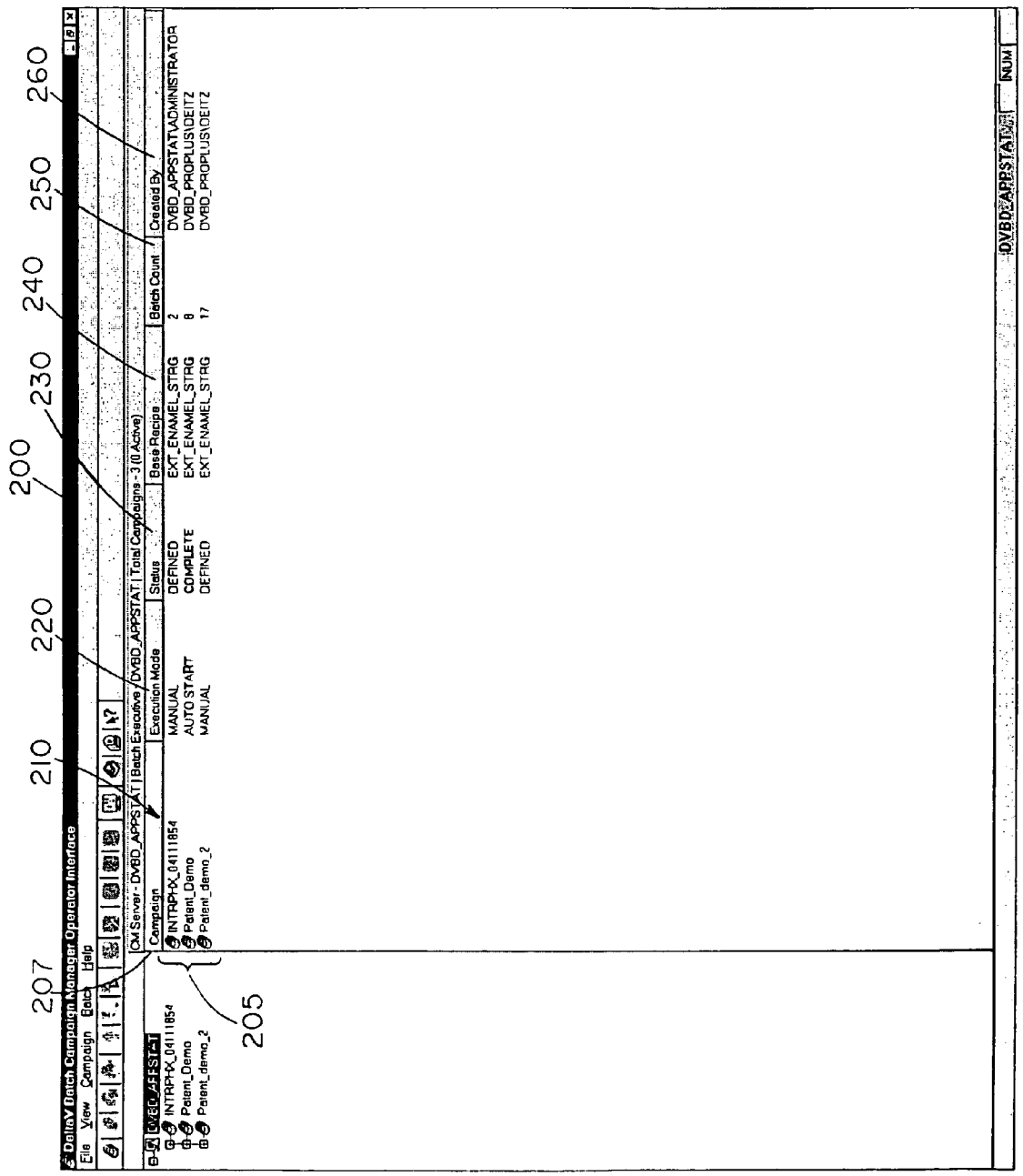
FIG. 3 is an exemplary illustration of a campaign list screen provided by the graphical user interface of FIG. 2.

FIG. 3 illustrates a campaign list screen 200 generated by the graphical user interface 120 that includes a list of campaigns 205 which have been created or defined by a user interacting with the campaign creation function 111. A header 207 includes a number of fields that further describe each of the campaigns in the list 205. A campaign field 210 includes a user defined campaign name which is used by the campaign manager 110 to identify the campaign during creation, editing, or execution of the campaign. The campaign name may be used throughout the process control system 10 to identify the campaign currently being created, edited, or executed to other process control functions such as, for example, the batch executive 130, the security system 140, and the data historian 150, or any other user interface or system within the process control system 10. An execution mode field 220 indicates which batch execution mode the user has selected for the campaign. As discussed in greater detail below, the user can select from a plurality of batch execution modes including manual, autorelease, and autostart modes, each of which is used by the campaign execution function 112 to control the release of batches to the batch executive 130 to make the most efficient use of the batch executive 130 processing and memory resources. A status field 230 indicates whether a batch has been executed (i.e., "Complete"), is currently active or running, or if the batch has only been defined, but has not yet been executed by the batch executive 130. A base recipe field 240 indicates which basic recipe was used to define a batch. In the exemplary list screen 200 shown in FIG. 3, all of the campaigns in the list 205 are based on the basic recipe for an exterior enamel paint, which is denoted as "EXT_E-NAMEL_STRG" in the base recipe field 240. A batch count field 250 indicates the number of batches that are included within each of the campaigns in the list 205 and a created by field 260 indicates which user created each of the campaigns.

Figure 4:
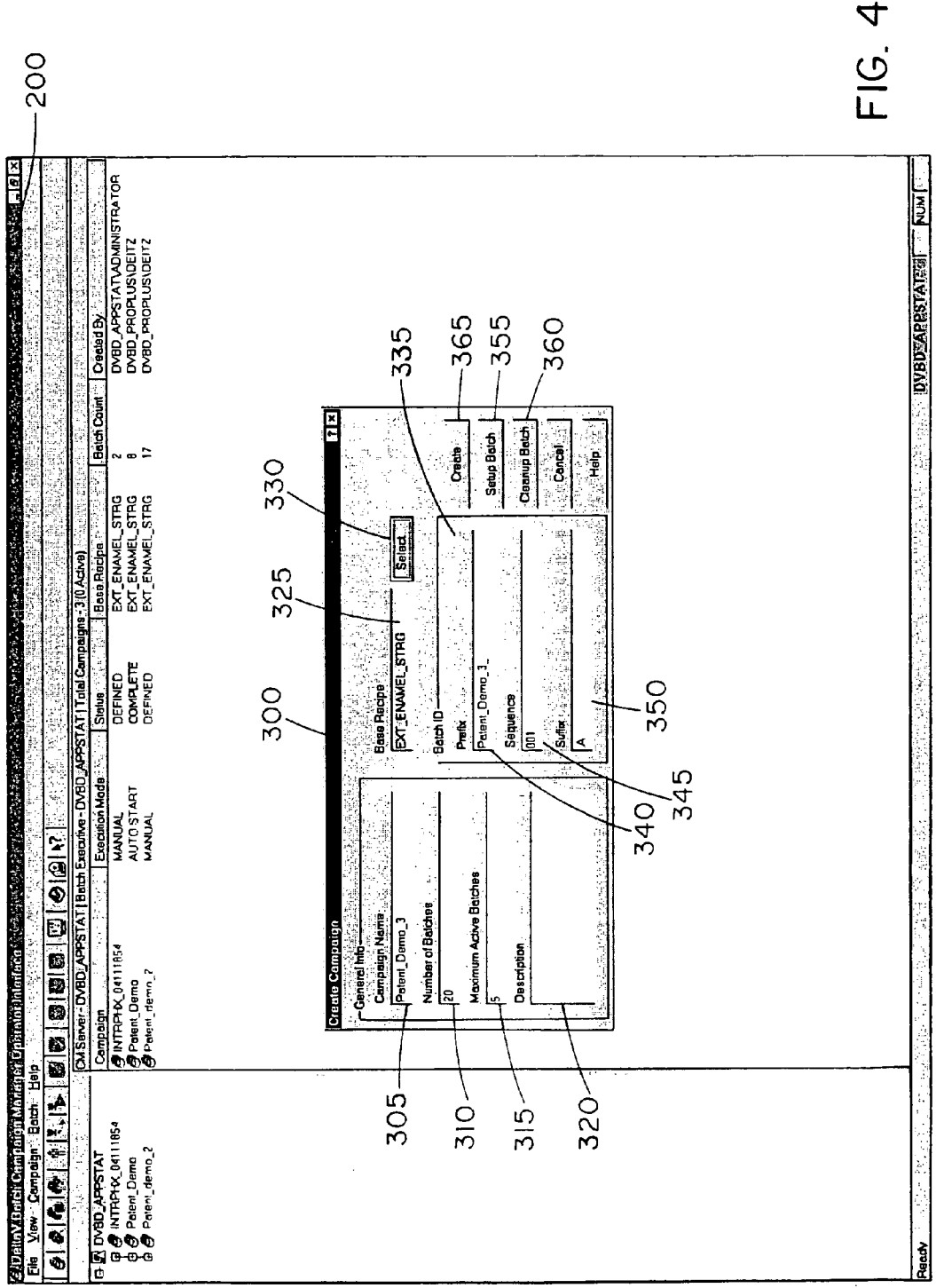
FIG. 4 is an exemplary illustration of a campaign creation dialog window that enables a user to create and add a new campaign to the campaign list of FIG. 3.

FIG. 4 illustrates an exemplary campaign creation dialog window 300 that enables a user to create and add a new campaign to the campaign list 205 shown in FIG. 3. Generally speaking, the dialog window 300 prompts the user via graphical entry blocks to enter information needed to create the campaign. Of course, any other technique of prompting the user for information may be used such as textual questions, etc. In particular, a campaign name block 305 enables a user to enter an alphanumeric name that will be used by the campaign manager 110, the batch executive 130 and any other process control function within the process control system 10 in connection with the campaign being created. A number of batches block 310 enables a user to enter the number of batches that are included within the campaign being created and a maximum active batches block 315 enables a user to enter the number of batches that can be simultaneously instantiated or running within the batch executive 130 at the same time. Typically, the user will enter a maximum number of active batches that fully utilizes available equipment. For example, if sufficient equipment exists within the process control system 10 to execute five batches simultaneously, then the user may set the maximum number of active batches to five as shown in FIG. 3.

A description block 320 enables the user to enter a textual description of the campaign being created. For example, the user may enter a customer name, a product name or description such as, for example, "Weatherkiller Six Star Exterior Latex" that is associated with the campaign, or any other textual description desired. A base recipe block 325 indicates which base recipe has been used to create the campaign and, as discussed in detail below in connection with FIGS. 5 and 6, a select button 330 may be used to select a different base recipe for the batch being created.

A batch identification block 335 includes a batch prefix block 340, a batch sequence start number block 345 and a batch suffix designator block 350. The batch identification block 335 enables the user to instruct the campaign creation function 111 how to name batches within the campaign being created. For example, with a prefix "Patent_Demo_3_," a sequence number "001," and a suffix ".A," the campaign creation function 111 will create successive batches named "Patent_Demo_3_XXX.A," where "XXX" begins with "001" and indexes upward by 1 for each batch within the campaign. Thus, with the above example where twenty batches are created, the campaign creation function 111 will name the last batch created "Patent_Demo_3_020.A."

A setup batch button 355 and a cleanup batch button 360 enable the user to include a special setup batch as the first batch of the campaign being created and/or a special cleanup batch as the last batch of the campaign. A setup batch may prepare the process control system for the running of a campaign by resetting equipment, checking availability of raw materials, etc. A cleanup batch, on the other hand, may flush mixing equipment between campaigns so that materials used in processing one campaign do not contaminate batches of a subsequently executed campaign. For example, if a first campaign produces batches of a red oil-based paint and a subsequent campaign produces batches of a white latex paint, a cleanup batch will be needed between the campaigns to ensure that the oil-base and the red coloring of the first campaign do not contaminate the second campaign of white latex paint.

Additionally, a user may want to include a cleanup batch between batches within a campaign which includes multiple types of batches that would result in batch contamination if run consecutively without cleaning the process control equipment between the different types of batches. For example, if the user defines a single campaign that includes ten batches of red oil-based paint and ten batches of green oil-based paint (that may or may not use the same basic paint recipe), a cleanup batch may be inserted between the last batch of red paint and the first batch of green paint to prevent color contamination of the green batches. Of course, in some cases different types of batches within a single campaign may be run consecutively through the process control equipment without running a risk of contamination. For instance, if a campaign contains ten batches of white latex paint followed by ten batches of black latex paint, a cleanup batch between the last batch of white paint and the first batch of black paint may not be required.

A create button 365 may be selected by the user to automatically generate all the batches specified within the create campaign window 300. In the exemplary window shown in FIG. 4, selecting the create button 365 will cause the campaign creation function 111 to create a campaign "Patent_Demo_3" including twenty batches (each having a unique name generated as described above in accordance with the batch identification block 335) of the recipe specified by the base recipe block 325.

Figure 5:
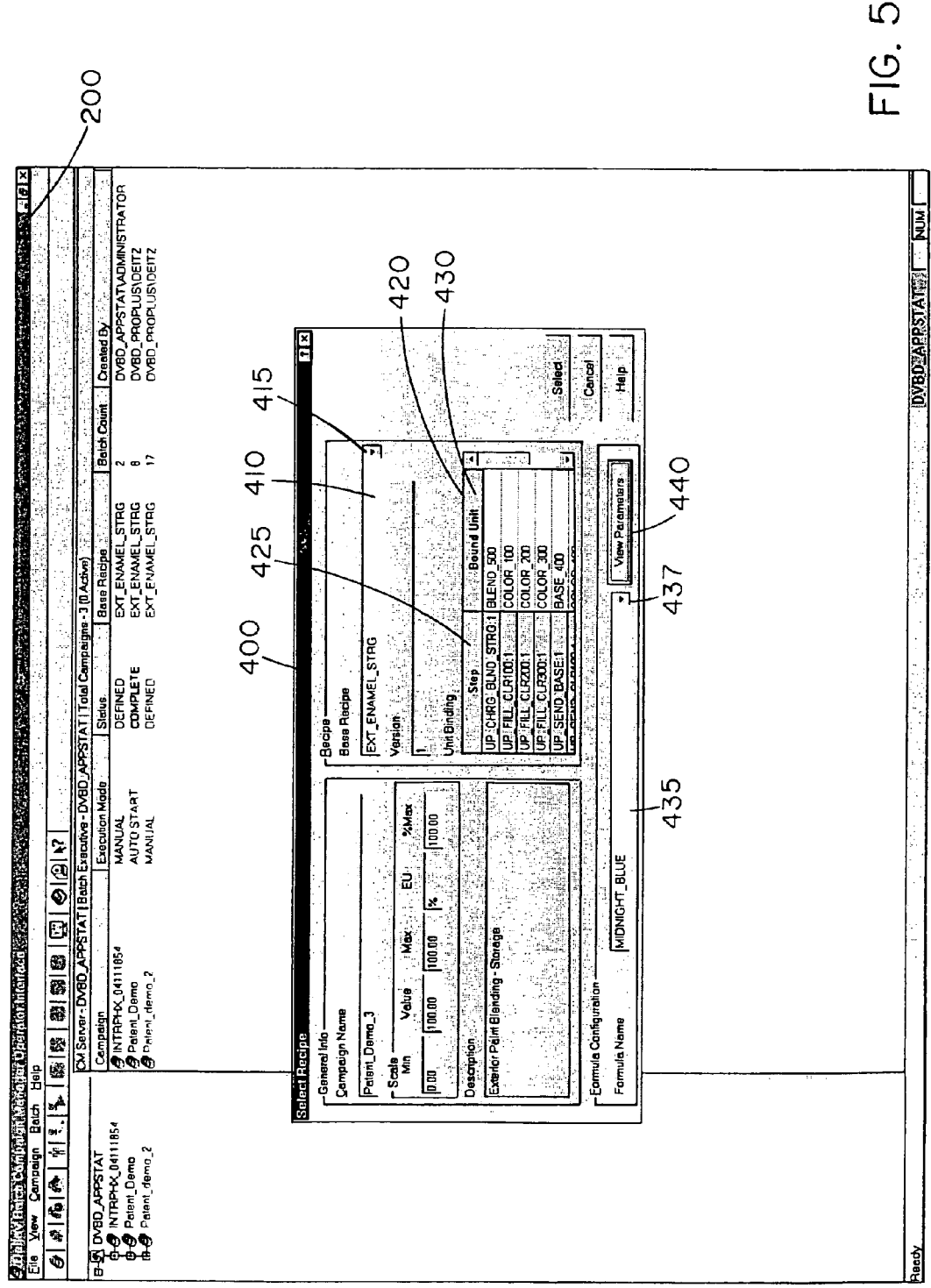
FIG. 5 is an exemplary illustration of a select recipe window that appears in response to a user activating the select button within the "create campaign" window of FIG. 4.

FIG. 5 is an exemplary illustration of a select recipe window 400 that appears in response to a user activating the select button 330 of the create campaign window 300 (FIG. 4). The select recipe window 400 enables the user to select and modify a basic paint recipe and allows the user to define a particular formulation of the selected basic recipe by entering batch parameter values associated with that particular formulation. A base recipe block 410 indicates which basic recipe is currently selected and a pull-down arrow 415, if selected, displays a plurality of additional base recipe types that may be selected using conventional point, highlight and select window operations.

A unit binding block 420 includes the process steps 425 and bound equipment 430 associated with each of the process steps 425. Each of the process steps 425 may be an object-based routine, or any other type of software routine, that performs actions, monitors process control parameters, etc. within the process control system 10 of FIG. 1. Additionally, each of the process steps 425 is associated with or is bound to with a particular piece of equipment such as, for example, the equipment 62–70 shown in FIG. 1. The user (e.g., an operator) can bind each of the process steps 425 to the appropriate equipment as needed. For example, a mixing step may be bound to a blender, such as one of the blenders 64 and 70 shown in FIG. 1, and a step that adds colorant to the base paint mixture may be bound to an appropriate one of the colorant dispensers 66 and 68.

A formula configuration block 435 enables a user to select a particular paint formula, which includes one or more batch parameter values that are used in batch executing the selected base recipe. By selecting a pull-down arrow 437, the user can view a list of available formulae and can select a particular formula using conventional point and click operations. Additionally, the user can select a view parameters button 440 to view and/or edit the parameter values associated with the currently selected formula.

Figure 6:
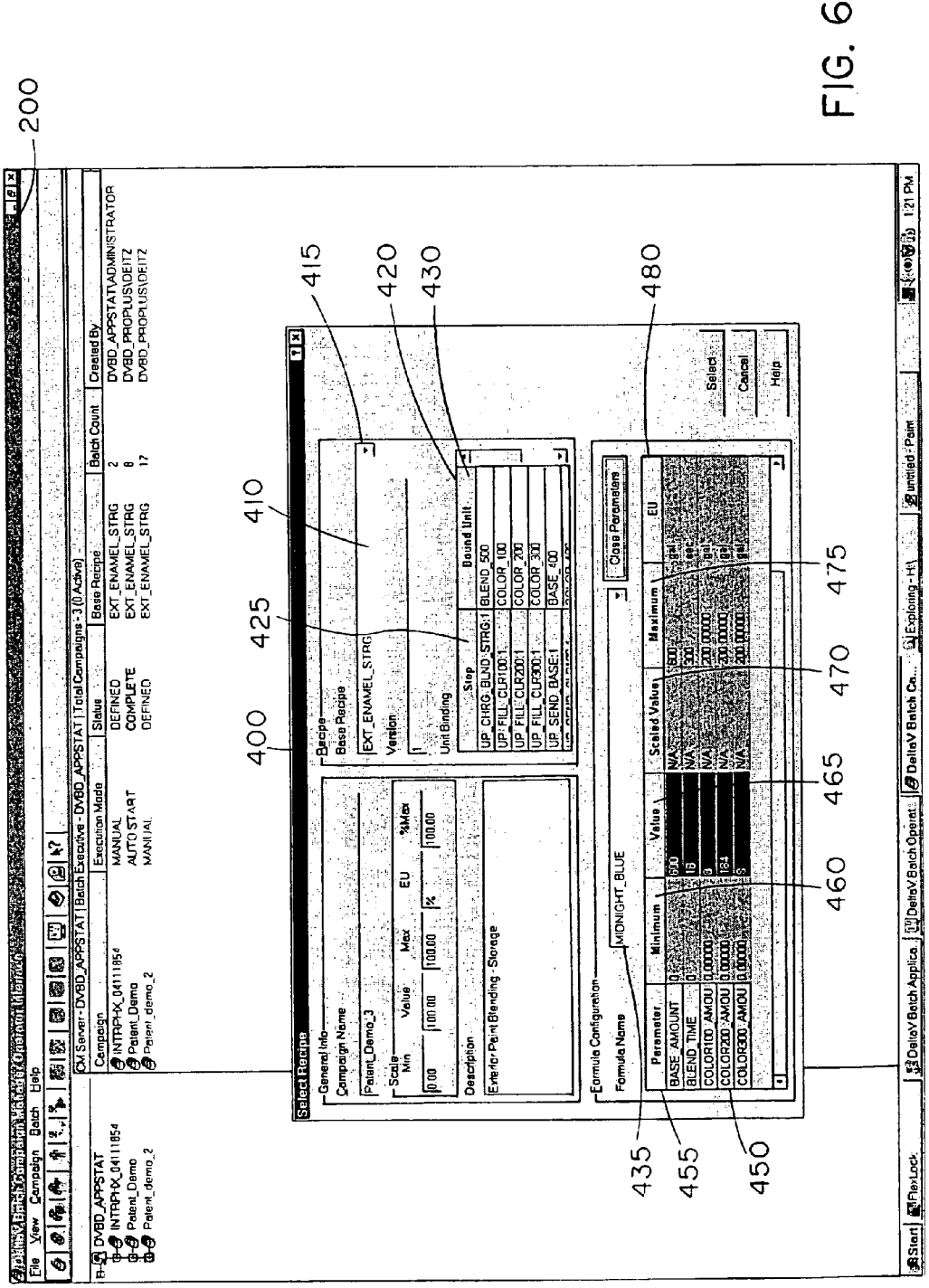
FIG. 6 is an exemplary illustration of the select recipe window that appears when a user has selected the "view parameters" button of FIG. 5.

FIG. 6 is an exemplary illustration of the select recipe window 400 that appears when a user has selected the view parameters button 440 shown in FIG. 5. As shown in FIG. 6, a parameters block 450 appears under the formula block 435. The parameters block 450 includes a table of all the parameters and parameter values that are needed to execute the process steps 425 of the selected base recipe. By way of example only, the parameters block 450 includes a list of parameter names 455 that correspond to parameters needed by the process steps 425 during batch execution of the base recipe. As shown in FIG. 6, each parameter may include a plurality of values such as, for example, a minimum value 460, a target value 465, a scaled value 470, a maximum value 475 and may also include engineering units 480 that are associated with the values. Of course, any other values and units could be included as well.

In addition to viewing the parameters within the parameter block 450, a user can edit the values associated with each of the parameters. For instance, if a user wants to increase the mixing time of a mixing process step or if the user wants to change the amount of particular colorant that is added to the paint mixture, the user can make an appropriate change to the value. To change a parameter value, the user may select a particular value that is to be changed and may enter a new value via a keyboard or any other data entry technique. If any such parameter value changes are made by the user, the campaign execution function 112 sends one or more parameter change messages to the execution engine 170 together with other batch-related information at the time the campaign execution function 112 releases the batch for execution by the batch execution engine 170.

It is important to recognize that all batch-related information that is presented to the user by the graphical operator interface 120 (such as, for example, the batch-related information shown in connection with FIGS. 3–6) is obtained from the batch executive 130 by the campaign manager 110. The campaign manager 110 fills the various batch-related fields of the displays generated by the graphical user interface 120 by sending requests for batch information to the batch executive 130, which, in turn, sends responsive messages containing the requested batch information to the campaign manager 110. For example, the campaign creation function 111 exchanges messages with the batch executive 130 to retrieve batch-related information from the database 180, which, in turn, may be sent to the graphical user interface 120 for display to the user in one or more display windows such as those shown in FIGS. 3–6 described above. Thus, the user does not have to inform the campaign creation function 11 of what recipes can be executed by the batch execution engine 170 or what process control equipment is available for executing a particular batch or campaign.

Figure 7:
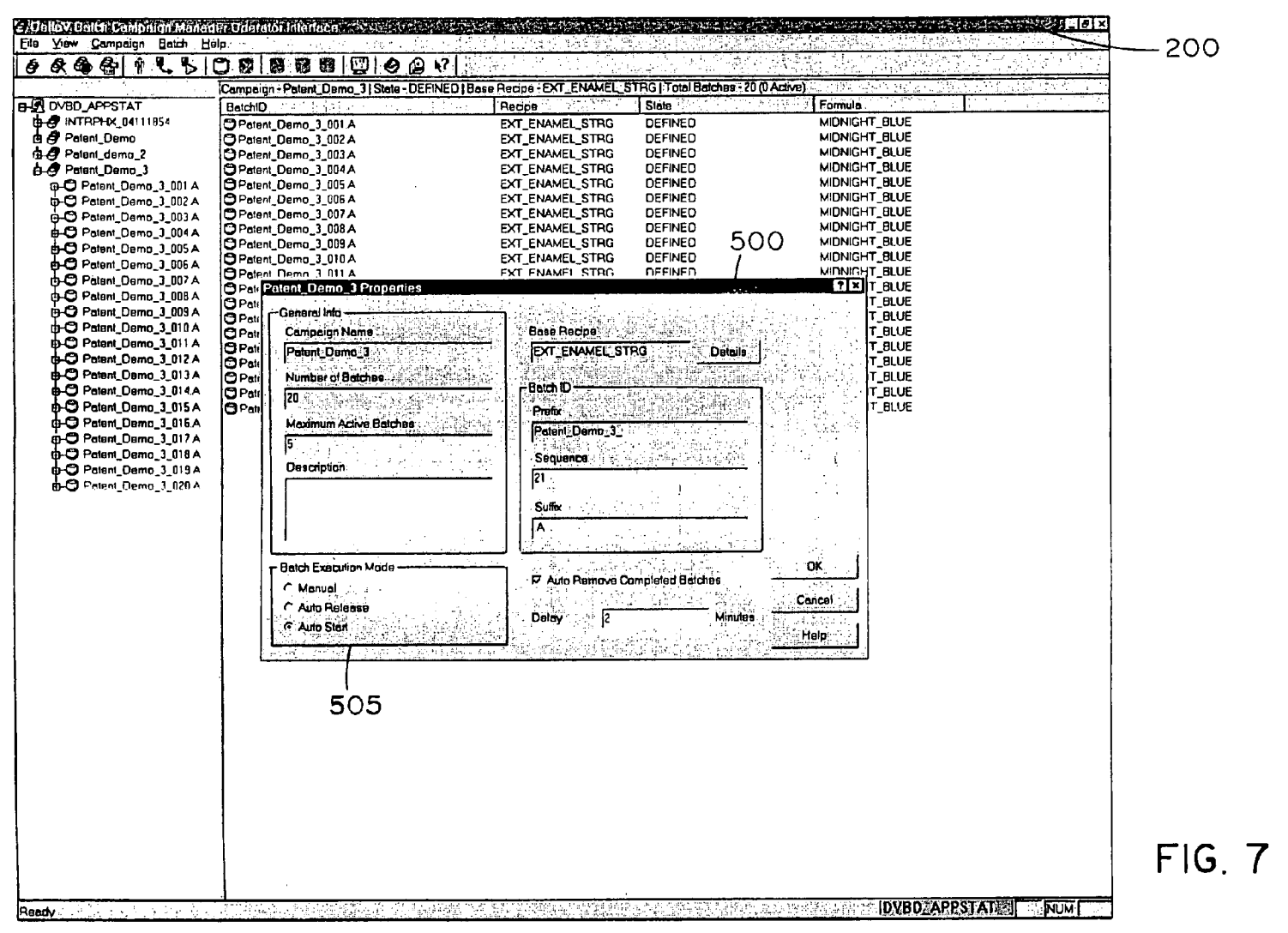

FIG. 7 is an exemplary illustration of a batch campaign properties window 500 that enables a user to select and optimize the manner in which batches within a campaign are released by the campaign execution function 112 and started by the batch execution engine 170. A batch execution mode block 505 shows three possible batch execution modes. A manual mode of operation releases batches to the batch execution engine 170 and starts the execution of released batches in response to the user manually selecting a batch for release and providing manual inputs to the campaign execution function 112 which, in turn, sends messages to the batch execution engine 170 that trigger the start of the released batch. The manual mode of operation may be used in process control systems that involve highly critical, costly, and/or potentially dangerous process steps, which are best executed in response to an attendant operator's instruction to start the process.

An autorelease mode of operation requires the user to manually start the execution of each batch within the campaign and makes a subsequent batch ready for execution prior to the completion of a predecessor batch. In other words, the autorelease mode of batch execution queues a second ready batch while a first batch is currently executing to eliminate the processing delay that may be associated with instantiating a batch within the batch execution engine 170 and delay associated with any other steps required to make the process control system 10 ready to execute a successor batch. Thus, the autorelease mode of batch execution enables the user to start a successor batch as soon as the predecessor batch completes execution, if desired.

An autostart mode of operation automatically releases, queues ready batches, and starts queued batches without any operator intervention. For example, while a first batch is executing, the campaign execution function 112 queues a second batch to be ready by instantiating the ready batch within the batch execution engine 170. When the first batch completes execution, the second batch is automatically started without requiring (or even requesting) any input from the operator. The autostart mode of batch execution may be particularly beneficial when used in process control systems that execute batches having a short cycle time and in which the nature of the processing is less critical and/or where processing errors are less costly, dangerous, etc. For example, a process control system that makes butter may have a very short cycle time and a relatively low cost for processing errors and, thus, would be well suited to using the autostart mode of batch execution. In fact, due to the short cycle time, operator intervention to manually start each new batch of butter may be more costly than the costs associated with the processing errors that could occur as a result of autostarting batches.

The maximum active batches specified will also affect the manner in which batches are released to and started by the batch execution engine 170. For example, if five active batches are specified by the campaign and sufficient equipment exists to support five active (i.e., executing) batches, then the campaign execution function 112 will release the first five batches of the campaign. Once these five batches are all started (either automatically or manually as specified by the batch execution mode selected), the campaign execution function 112 will make ready an additional batch (i.e., an additional batch is queued within the batch execution engine 170 and is ready to be executed).

In any event, the batch execution modes discussed above control the release of batches to the batch execution engine 170 so that an entire campaign of batches does not have to be sent to the batch executive 130 at the same time. Instead, the campaign execution function 112 can, for example, release a single batch to the batch executive 130 for execution by the batch execution engine 170 and may (depending on which batch execution mode is selected) make a subsequent batch ready for execution prior to the completion of a batch that is currently being executed. Because the campaign execution function 112 does not instantiate the entire campaign (which in the example given above would consist of twenty batches) within the batch executive 130, the campaign manager 110 minimizes the demands placed on the processing and memory resources of the batch executive 130.

Figure 8:
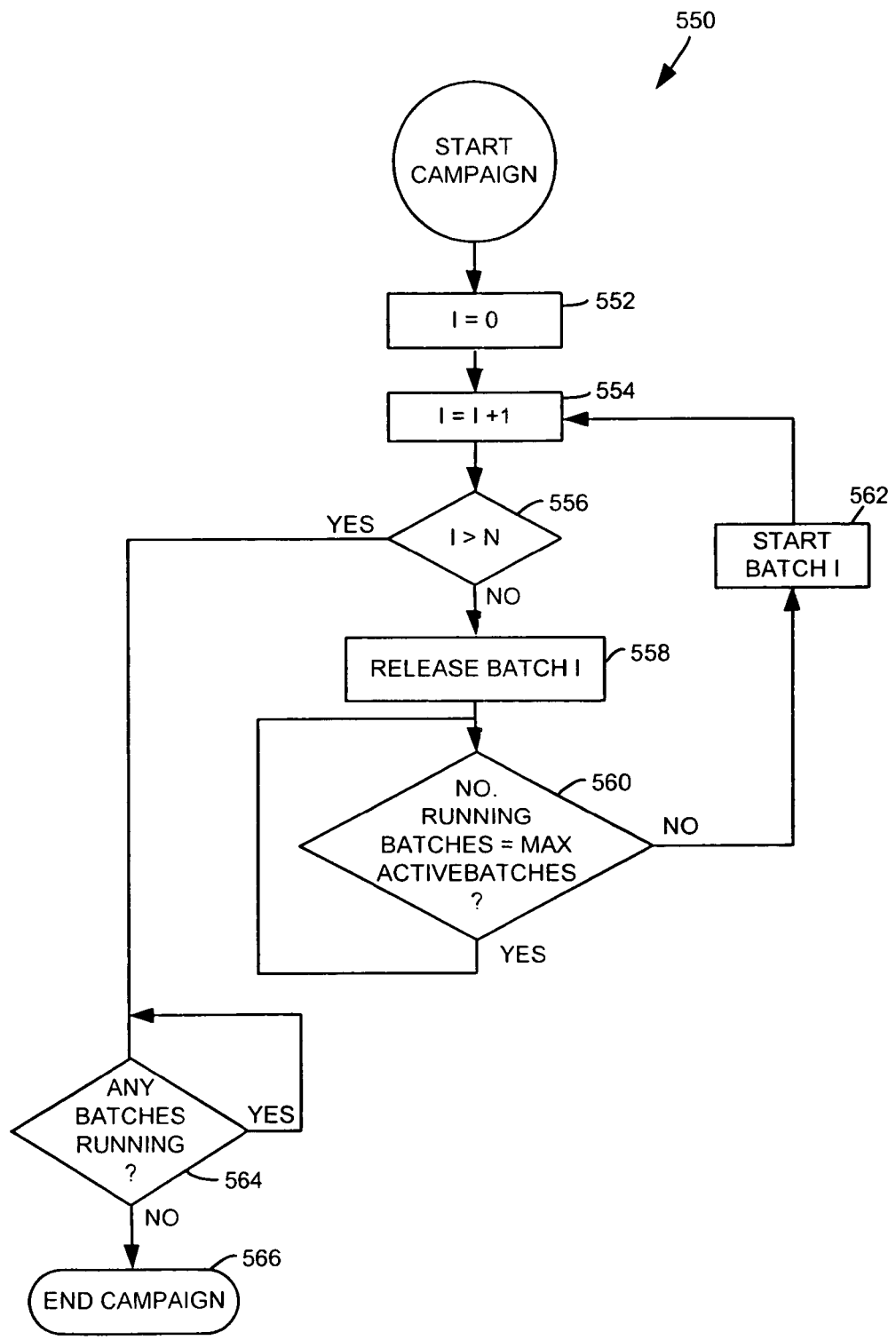
FIG. 8 is an exemplary flow diagram that illustrates how the campaign execution function and the batch execution engine of FIG. 2 cooperate to execute a batch process campaign using an autostart batch execution mode.

FIG. 8 is an exemplary flow diagram 550 that illustrates how the campaign execution function 112 and the batch execution engine 170 cooperate to execute a campaign of N batches using the autostart batch execution mode described above. In block 552, the campaign execution function 112 sets a counter I to zero and, in block 554, the campaign execution function 112 increments the counter I by one. In block 556, the campaign execution function 112 determines if the counter I is currently greater than the number of batches (N) in the campaign and, if the counter I is not currently greater than N, then the campaign execution function 112 enters block 558. In block 558, the campaign execution function 112 releases batch I to the batch execution engine 170 and, in block 560, the campaign execution function 112 determines if the number of batches currently being executed by the batch execution engine 170 is equal to the maximum active batches (as specified by the user). If the number of batches currently being executed is equal to the maximum active batches, the campaign execution function 112 reenters block 560. If the number of batches currently being executed is not equal (i.e., is less than) the maximum active batches, then the campaign execution function 112 enters block 562. In block 562, the campaign execution function 112 starts batch I and then reenters block 554. If the campaign execution function 112 determines in block 556 that the counter I is greater than N (i.e., the number of batches in the campaign), then the campaign execution function 112 enters block 564. In block 564, the campaign execution function 112 determines if there are any batches still being executed by the batch execution engine 170 and, if batches are still being executed, the campaign execution function 112 reenters block 564. On the other hand, if the campaign execution function 112 determines in block 564 that no batches are currently being executed, then the campaign execution function 112 enters block 566 and terminates the campaign.

Figure 9:
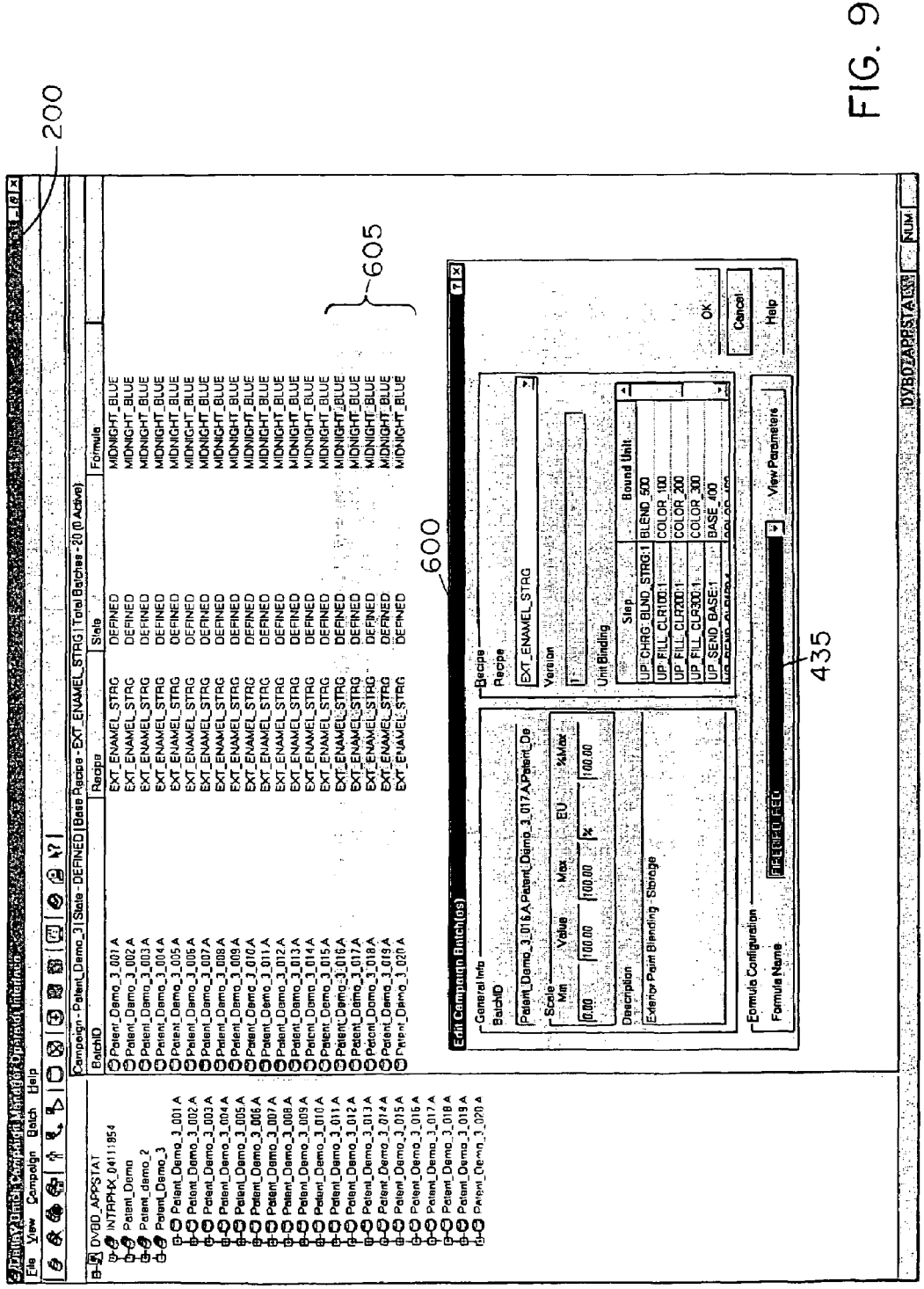
FIG. 9 is an exemplary illustration of a batch editing window that enables a user to edit one or more batches within a campaign.
Figure 10:
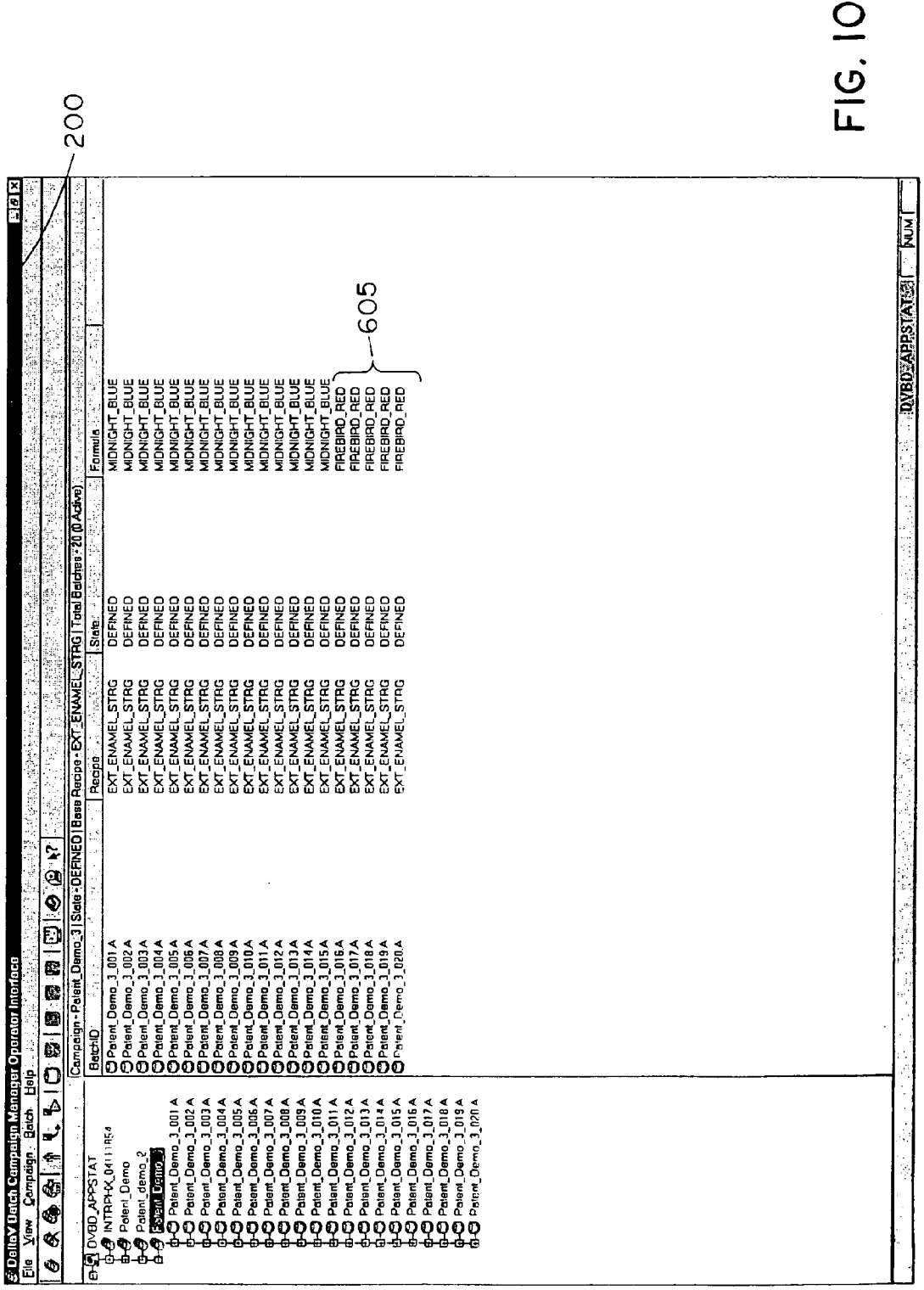
FIG. 10 is an exemplary illustration of a window showing a changed group of batches associated with the batch editing window of FIG. 9.

FIG. 9 is an exemplary illustration of a batch editing window 600 that enables a user to edit one or more batches within a campaign. By way of example only, the user has selected a group 605 of five batches of the campaign "Patent_Demo_3" for editing and has changed, via the formula block 435, the formula for these batches from MIDNIGHT_BLUE to FIREBIRD_RED. FIG. 10 shows the changed group of batches 605, which now are defined to use to formula FIREBIRD_RED as indicated under the heading "Formula" in the list window 200.

In is important to recognize that the editing of a campaign, as shown by way of example in FIGS. 9 and 10, can be carried out only on batches within the campaign that have not already been released to the batch execution engine 170. However, the ability to edit unreleased batches on-the-fly may be particularly useful in situations where an equipment failure occurs during the execution of a campaign. For example, if the first blender 64 of the process control system 10 (FIG. 1) fails during execution of a campaign, the user can edit unreleased batches to bind any process steps originally bound to the first blender 64 to the second blender 70 (or any other available blender). Similarly, if a late customer order or order change request, for example, requires changes to the formula or recipe associated with one or more unreleased batches of a campaign, the user can make appropriate modifications to the recipe and/or formula associated with these unreleased batches. Of course, if desired, the user may add new batches to a campaign or delete batches entirely.

Additionally, if desired, the user can also change the batch execution mode associated with a campaign. For example, if the user desires to modify batches within a currently running campaign that is configured to autorelease or autostart batches, it may be necessary to change the batch execution mode to a manual release mode to prevent the inadvertent release and/or start of a batch during the editing process.

In addition to being tightly integrated with the batch executive 130, the campaign manager 110 is also tightly integrated with the security system 140 and the batch historian 150. In particular, the campaign execution function 112 automatically sends campaign management messages in the proper format directly to the batch historian 150 for storage without requiring any intervention from the batch executive 130 or the user. Likewise, the access control features of the security system 140 are used to control, via a username and password, for example, a user's ability to modify and execute batch process campaigns in a manner similar to that which controls user access within other conventional process control applications such as recipe definition, definition of equipment lists, etc. Additionally, the campaign manager 110 incorporates a persistent data mechanism that allows the campaign manager 110 to recover and update the status of batches within a campaign in the event of a process control system failure.

Still further, the campaign manager 110 may be implemented using a scriptable object, which, as is well known, may be hostable in web-based applications. Furthermore, the campaign manger 110 is configured within the process control system 10 shown in FIG. 1 to operate within a client-server system architecture. In this manner, the campaign manager 110 may reside on the server 16, which may be a workstation or any other system having a processor, and the other process control functions such as the batch executive 130, the security system 140, and the data historian 150, etc. may reside on the same or other workstations and/or nodes of the process control system 10. These other process control functions may communicate with the campaign manager 110 over the system level databus 18 or any other hardwired or wireless communication link. Additionally, a plurality of clients (such as the clients 32 and 34) which may be running operator interfaces on virtually any hardware platform (e.g., barcode readers, personal data assistants, laptops, palmtops, etc.) can communicate with the campaign manager 110 and may receive event messages that are automatically generated by the campaign manager 110 without having to poll or request updates from the campaign manager 110.

The campaign management technique described herein communicates with the batch definition and execution functions and automatically receives, in response to requests by a campaign management function, batch information (e.g., recipes, batch parameters, equipment lists, etc.) from the database used by the batch definition and execution functions. In this manner, the campaign management technique described herein eliminates the requirement for the user to enter batch-related database information directly into the campaign management function and further eliminates the need for the user to create and update batch information databases within more than one application (i.e., synchronize the databases between applications), as is typically required with conventional campaign creation and execution techniques. Thus, the campaign management technique described herein allows the batch definition and execution functions to maintain a single batch database that includes information relating to the definition of recipes, configuration of equipment (e.g., binding of equipment to process steps), etc. In other words, with the campaign management technique described herein the user does not, for example, have to inform the campaign management function of what recipes can be executed within a batch execution function or what process control equipment is available for executing a particular batch or campaign.

Still further, the campaign management technique described herein enables a user to flexibly create campaigns so that a campaign can include multiple types of batches. Thus, with the campaign management technique described herein, a campaign is not limited to executing one type of batch multiple times, as is the case with conventional batch definition and execution techniques. For example, within a single campaign, the user can produce a batch of midnight blue semi-gloss latex paint, a batch of navy blue semi-gloss latex paint and a batch of red oil-based paint. Also, for example, this campaign management technique enables a user to include special batches such as a setup batch that uses a special setup recipe, which is always executed first within a campaign to prepare the process control system equipment for the campaign, and a special cleanup batch that uses a special cleanup recipe which is executed after all other batches within the campaign have been executed.

Additionally, the campaign management technique described herein controls the release of batches to the batch execution function in a manner that makes efficient use of memory and processing resources. For example, the user can select one from a plurality of campaign management operating modes that release batches to the batch execution function as equipment resources become available to execute the batches, as opposed to releasing an entire campaign of batches to the batch executive regardless of equipment resource availability, which, as described above, can be the case with conventional campaign creation and execution techniques.

The campaign management technique described herein can be configured to release (i.e., send) batches to the batch execution function as equipment becomes available to execute the batch. In this manner, unreleased batches are not instantiated within the memory resources of the batch execution function but, instead, remain within the campaign management application. Furthermore, these unreleased batches can be substantively modified by the user prior to their release to the batch execution function, thereby enabling a user to make changes to unreleased batches within a running campaign without requiring the user to halt the currently running campaign and to create an entirely new campaign to make the desired changes. For example, the user may respond to equipment breakdowns that occur while a campaign is executing by editing process steps within the unreleased batches so that process steps bound to failed equipment are modified to bind these process steps to an alternative piece of functional equipment. Also, for example, the ability to modify unreleased batches enables the user to change a campaign to respond to late customer orders. For instance, if a campaign initially includes twenty batches of midnight blue exterior latex paint and a customer requests after the campaign is started that two batches of the midnight blue paint now be navy blue interior oil-based paint, the user can edit two unreleased batches of the original campaign so that these unreleased batches specify a recipe associated with interior oil-based paint and parameter values that produce the color navy blue instead of midnight blue.

The campaign management technique described herein can be configured within a process control system using a client-server system architecture. In this manner, the campaign management function may reside on a server (which may be a workstation or any other system having a processor) on a node of the process control system and other process control functions such as batch definition and execution functions, a data historian function, a security function, etc. may reside on the same or other workstations and/or nodes of the process control system. These other process control functions may communicate with the campaign management function over a databus or any other hardwired or wireless communication link. Additionally, a plurality of clients, which may be running operator interfaces on virtually any hardware platform (e.g., personal data assistants, laptops, palmtops, etc.), can communicate with the campaign management function and may receive event messages that are automatically generated by the campaign management function without having to poll or request updates from the campaign management function.

The campaign management technique described herein also enables the campaign management function to be tightly linked to other functions of the process control system such as, for example, a batch historian function and a security function. Thus, the campaign management function can automatically send campaign management messages directly to the batch historian for storage without requiring any intervention from the batch execution function or the user. Likewise, the access control features of the security function can be used to control, via a username and password, for example, a user's ability to define and execute batch process campaigns in a manner similar to that which controls user access within other conventional process control applications such as recipe definition, definition of equipment lists, etc. Additionally, the campaign management technique described herein incorporates a persistent data mechanism that allows the campaign management function to recover and update the status of batches within a campaign in the event of a process control system failure.

If implemented in software, the functional blocks and routines discussed herein may be stored in any computer readable memory such as on a magnetic, an optical, or other storage medium, in a RAM or ROM of a computer, controller, field device, etc. Likewise, this software may be modulated on a carrier and delivered to a user or a device via any known or desired delivery method including, for example, over a communication channel such as a telephone line, the Internet, etc.

While the invention has been described with reference to specific examples, which are intended to be illustrative only and not to be limiting of the invention, it will be apparent to those of ordinary skill in the art that changes, additions or deletions may be made to the disclosed embodiments without departing from the spirit and the scope of the invention.

What is claimed is:

1. A method of creating a batch process campaign including a plurality of batches for use in a process control system having a batch executive and a graphical user interface, the method comprising the steps of:
    sending a first message requesting batch information to the batch executive, the batch executive configured to send instructions to a process controller for directing a set of field devices to carry out process steps associated with a batch being executed by the batch executive, the batch executive having a database containing batch information;

receiving from the batch executive a second message containing a set of batch information in response to the first message requesting batch information, the set of batch information including recipe information, the set of batch information retrieved from the database of the batch executive;

displaying the set of batch information using the graphical user interface;

prompting a user to enter a first input identifying a subset of the set of batch information from the displayed set of batch information to be included within at least one batch from the plurality of batches;

prompting the user to enter a second input specifying campaign information to be included within the batch process campaign;

using the first and second inputs to create the batch process campaign; and executing the batch process campaign by releasing batch process instructions to the batch executive.

2. The method of claim 1, wherein the step of requesting the recipe information includes the step of requesting recipe information associated with a setup batch.

3. The method of claim 1, wherein the step of requesting the recipe information includes the step of requesting recipe information associated with a cleanup batch.

4. The method of claim 1, wherein the step of prompting the user to enter the second input specifying campaign information to be included within the batch process campaign includes the step of prompting the user to specify a batch execution mode.

5. The method of claim 1, wherein the step of prompting the user to enter the second input specifying campaign information to be included within the batch process campaign includes the step of prompting the user to specify a maximum number of active batches.

6. The method of claim 1, wherein the step of prompting the user to enter the second input specifying campaign information to be included within the batch process campaign includes the step of prompting the user to specify a number of batches within the batch process campaign.

7. The method of claim 1, wherein the step of prompting the user to enter the second input specifying campaign information to be included within the batch process campaign includes the step of prompting the user to specify a parameter value associated with a process step.

8. The method of claim 1, wherein the step of prompting the user to enter the second input specifying campaign information to be included within the batch process campaign includes the step of prompting the user to specify batch identification information.

9. A system that creates a batch process campaign including a plurality of batches for use in a process control system having a batch executive, a graphical user interface and a processor, the system comprising:
a computer readable medium;
a plurality of routines stored on the computer readable medium and adapted to be executed by the processor, wherein the plurality of routines comprises:
a first routine adapted to send a first message requesting batch information to the batch executive, the batch executive configured to send instructions to a process controller for directing a set of field devices to carry out process steps associated with a batch being executed by the batch executive, the batch executive having a database containing batch information;

a second routine adapted to receive a second message from the batch executive containing a set of batch information in response to the first message requesting batch information, the set of batch information including recipe information, the set of batch information retrieved from the database of the batch executive;

a third routine adapted to display the set of batch information using the graphical user interface;

a fourth routine adapted to prompt a user to enter a first input identifying a subset of the set of batch information from the displayed set of batch information to be included within at least one batch from the plurality of batches;

a fifth routine adapted to prompt the user to enter a second input specifying campaign information to be included within the batch process campaign; and a sixth routine adapted to use the first and second inputs to create the batch process campaign; and a seventh routine adapted to release batch process instructions to the batch executive, the batch process instructions configured to cause the batch process campaign to be executed.

10. The system of claim 9, wherein the first routine is further adapted to request recipe information associated with a setup batch.

11. The system of claim 9, wherein the first routine is further adapted to request recipe information associated with a cleanup batch.

12. The system of claim 9, wherein the fifth routine is further adapted to prompt the user for a batch execution mode.

13. The system of claim 9, wherein the fifth routine is further adapted to prompt the user for a number of batches within the batch process campaign.

14. The system of claim 9, wherein the fifth routine is further adapted to prompt the user for a maximum number of active batches.

15. The system of claim 9, wherein the fifth routine is further adapted to prompt the user for a parameter value associated with a process step.

16. The system of claim 9, wherein the fifth routine is further adapted to prompt the user for batch identification information.

17. A method of executing a batch process campaign including a plurality of batches for use in a process control system having a batch executive, the method comprising the steps of:
sending a first message requesting batch information to the batch executive, the batch executive configured to send instructions to a process controller for directing a set of field devices to carry out process steps associated with a batch being executed by the batch executive, the batch executive having a database containing batch information;

receiving from the batch executive a second message containing a set of batch information in response to the first message requesting batch information, the set of batch information retrieved from the database of the batch executive;

creating the batch process campaign using at least a portion of the set of batch information retrieved from the database of the batch executive;

determining a batch execution mode associated with the batch process campaign;

releasing one or more batches from the plurality of batches to the batch executive based on the batch execution mode; and sending messages to the batch executive to cause the batch executive to execute one or more of the released batches.

18. The method of claim 17, wherein the step of releasing the one or more batches from the plurality of batches to the batch executive based on the batch execution mode includes the step of releasing a ready batch prior to the complete execution of a currently executing batch.

19. The method of claim 17, wherein the step of sending the messages to the batch executive to cause the batch executive to execute the one or more of the released batches includes the step of sending a message to cause the batch executive to execute the one or more released batches according to the batch execution mode.

20. The method of claim 17, wherein the step of sending the messages to the batch executive to cause the batch executive to execute the one or more of the released batches includes the step of sending a message specifying a parameter value associated with a process step associated with the one or more of the released batches.

21. The method of claim 17, wherein the step of sending the messages to the batch executive to cause the batch executive to execute the one or more of the released batches includes the step of sending a message specifying a recipe associated with the one or more of the released batches.

22. The method of claim 17, wherein the step of releasing the one or more batches from the plurality of batches to the batch executive based on the batch execution mode includes the step of releasing the one or more batches from the plurality of batches according to a user specified maximum number of active batches.

23. A system that executes a batch process campaign including a plurality of batches for use in a process control system having a processor and a batch executive, the system comprising:

a computer readable medium; and a plurality of routines stored on the computer readable medium and adapted to be executed by the processor, wherein the plurality of routines comprises:

a first routine adapted to send a first message requesting batch information to the batch executive, the batch executive configured to send instructions to a process controller for directing a set of field devices to carry out process steps associated with a batch being executed by the batch executive, the batch executive having a database containing batch information;

a second routine adapted to receive from the batch executive a second message containing a set of batch information in response to the first message requesting batch information, the set of batch information retrieved from the database of the batch executive;

a third routine adapted to create the batch process campaign using at least a portion of the set of batch information retrieved from the database of the batch executive;

a fourth routine adapted to determine a batch execution mode associated with the batch process campaign;

a fifth routine adapted to release one or more batches from the plurality of batches to the batch executive based on the batch execution mode; and a sixth routine adapted to send messages to the batch executive to cause the batch executive to execute one or more of the released batches.

24. The system of claim 23, wherein the fifth routine is further adapted to release a ready batch prior to the complete execution of a currently executing batch.

25. The system of claim 23, wherein the sixth routine is further adapted to send a message to cause the batch execution function to execute the one or more released batches according to the batch execution mode.

26. The system of claim 23, wherein the sixth routine is further adapted to send a message specifying a parameter value associated with a process step associated with the one or more of the released batches.

27. The system of claim 23, wherein the sixth routine is further adapted to send a message specifying a recipe associated with the one or more of the released batches.

28. The system of claim 23, wherein the fifth routine is further adapted to release the one or more batches from the plurality of batches according to a user specified maximum number of active batches.

29. A method of editing a batch process campaign including a plurality of batches for use in a process control system having a graphical user interface and a data store, the method comprising the steps of:

sending a first message requesting batch information to a batch executive, the batch executive configured to send instructions to a process controller for directing a set of field devices to carry out process steps associated with a batch being executed by the batch executive, the batch executive having a database containing batch information;

receiving from the batch executive a second message containing a set of batch information in response to the first message requesting batch information, the set of batch information retrieved from the database of the batch executive;

creating the batch process campaign using at least a portion of the set of batch information retrieved from the database of the batch executive;

prompting a user to enter a first input via the graphical user interface identifying one or more unreleased batches from the batch process campaign;

prompting the user to enter a second input via the graphical user interface specifying a change to batch information associated with the identified one or more unreleased batches, including prompting the user to enter an input specifying a recipe change to the batch information; and storing the change to the batch information together with the batch process campaign in the data store before sending a batch of the batch process campaign to the batch executive.

30. The method of claim 29, wherein the step of prompting the user to enter the second input via the graphical user interface specifying the change to batch information associated with the identified one or more unreleased batches includes the step of prompting the user to enter the second input while the batch process campaign is executing.

31. The method of claim 29, wherein the step of prompting the user to enter the first input via the graphical user interface specifying the change to the batch information associated with the identified one or more unreleased batches includes the step of prompting the user to enter an input specifying a parameter value change.

32. The method of claim 29, wherein the step of prompting the user to enter the second input via the graphical user interface specifying the change to the batch information associated with the identified one or more unreleased batches includes the step of prompting the user to enter an input specifying an additional batch to be added to the batch process campaign.

33. A system that edits a batch process campaign for use in a process control system having a processor, a graphical user interface and a data store, the system comprising:
   a computer readable medium; and
   a plurality of routines stored on the computer readable medium and adapted to be executed by the processor, wherein the plurality of routines comprise:
      a first routine adapted to send a first message requesting batch information to a batch executive, the batch executive configured to send instructions to a process controller for directing a set of field devices to carry out process steps associated with a batch being executed by the batch executive, the batch executive having a database containing batch information;
      a second routine adapted to receive from the batch executive a second message containing a set of batch information in response to the first message requesting batch information, the set of batch information retrieved from the database of the batch executive;
      a third routine adapted to create the batch process campaign using at least a portion of the set of batch information retrieved from the database of the batch executive;
   a fourth routine adapted to prompt a user to enter a first input via the graphical user interface identifying one or more unreleased batches from the batch process campaign;
   a fifth routine adapted to prompt the user to enter a second input via the graphical user interface specifying a change to batch information associated with the identified one or more unreleased batches, the second routine adapted to prompt the user to enter an input specifying a recipe change to the batch information; and
      a sixth routine adapted to store the change to the batch information together with the batch process campaign in the data store.

34. The system of claim 33, wherein the second routine is further adapted to prompt the user to enter the second input while the batch process campaign is executing.

35. The system of claim 33, wherein the fifth routine is further adapted to prompt the user to enter an input specifying a parameter value change.

36. The system of claim 33, wherein the fifth routine is further adapted to prompt the user to enter an input specifying an additional batch to be added to the batch process campaign.

37. A batch process campaign management system for use in a process control system, comprising:
   a batch executive including a batch information database and a batch execution engine, the batch executive configured to send instructions to a process controller for directing a set of field devices to carry out process steps associated with a batch being executed by the batch executive; and
   a campaign manager communicatively coupled to the batch executive that exchanges messages with the batch executive, wherein the messages contain batch-related information from the batch information database and campaign-related information generated by the campaign manager in response to a user input, the campaign manager configured to create a batch process campaign using batch-related information from the batch information database of the batch executive and user inputs identifying a set of the batch information to be included within a batch process campaign.

38. The system of claim 37, wherein the batch executive further includes a batch definition/instantiation function.

39. The system of claim 37, further comprising a graphical user interface that is communicatively coupled to the campaign manager, and wherein the campaign manager includes a campaign creation function, a campaign execution function and a campaign editing function.

40. The system of claim 39, wherein the campaign creation function displays batch information using the graphical user interface and the batch-related information from the batch information database.

41. The system of claim 40, wherein the batch process campaign includes multiple types of batches.

42. The system of claim 37, wherein the batch-related information includes recipe information.

43. The system of claim 37, wherein the batch-related information includes parameters associated with process steps.

44. The system of claim 37, wherein the campaign-related information includes a batch execution mode.

45. The system of claim 37, wherein the campaign manager automatically sends messages to a batch historian that maintains historical campaign information and a security system that controls user access.

* * * * *

UNITED STATES PATENT AND TRADEMARK OFFICE
CERTIFICATE OF CORRECTION

PATENT NO. : 7,020,876 B1
APPLICATION NO. : 09/609091
DATED : March 28, 2006
INVENTOR(S) : David L. Deitz et al.

It is certified that error appears in the above-identified patent and that said Letters Patent is hereby corrected as shown below:

At column 8, line 45, "may running" should be -- may be running --.

Signed and Sealed this

Sixth Day of March, 2007

JON W. DUDAS
*Director of the United States Patent and Trademark Office*